3,239,419
ANABOLICALLY-ACTIVE 3-METHYLENE-
STEROIDS
Klaus Brückner, Darmstadt-Eberstadt, and Klaus Irmscher, Darmstadt, Germany, assignors to E. Merck Aktiengesellschaft, Darmstadt, Germany
No Drawing. Filed Feb. 5, 1963, Ser. No. 256,269
Claims priority, application Germany, Feb. 10, 1962, M 51,763; July 21, 1962, M 53,649
20 Claims. (Cl. 167—74)

This invention relates to new anabolically-active steroids which are highly efficient and which are substantially devoid of deleterious side reactions. More particularly, this invention relates to 3-methylene-steroids.

Various anabolic agents have been suggested by the prior art; however their usefulness has been limited in many instances by relatively serious side reactions.

The principal object of this invention therefore is to provide novel anabolically-active steroids of very high efficiency and substantially devoid of deleterious side reactions.

Another object is to provide processes for the preparation of these anabolically-active steroids.

Still further objects include pharmaceutical preparations and applications based on these new steroids.

Upon further study of the specification and appended claims, other objects and advantages of this invention will become apparent.

The novel steroids of this invention include compounds conforming to the following structural formula:

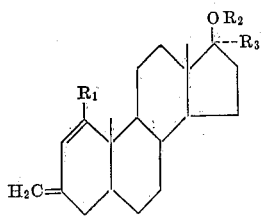

wherein $R_1$ represents hydrogen or methyl; $R_2$ represents hydrogen or the group $R_4$ —CO—; $R_3$ represents hydrogen, methyl or ethyl; $R_4$ represents an aliphatic, cycloaliphatic, olefinic, aromatic or araliphatic hydrocarbon radical containing 1 to 12 carbon atoms.

In particular, compounds represented by the following structural formulas Ia, Ib, Ic and Id may be prepared according to the invention.

Formula Ia:

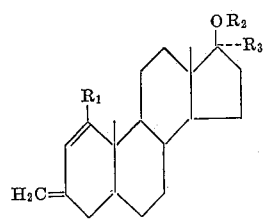

wherein $R_1$ and $R_3$ have the meanings previously indicated;
Formula Ib:

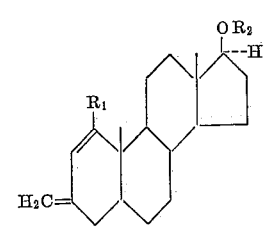

wherein $R_1$ and $R_2$ have the meanings previously indicated;
Formula Ic:

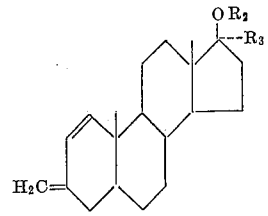

wherein $R_2$ and $R_3$ have the meanings previously indicated;
Formula Id:

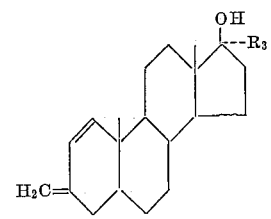

The following specific compounds are exemplary of the novel steroids of this invention:

3-methylene-1-androstene-17β-ol
3-methylene-17α-methyl-1-androstene-17β-ol
3-methylene-17α-ethyl-1-androstene-17β-ol
1-methyl-3-methylene-1-androstene-17β-ol
1,17α-dimethyl-3-methylene-1-androstene-17-ol
1-methyl-3-methylene-17α-ethyl-1-androstene-17β-ol and the formates, acetates, propionates, butyrates, isobutyrates, valerates, caproates, enanthates, caprylates, hexahydrobenzoates, undecylenates, benzoates, cyclopentyl-, cyclohexyl- and phenyl-acetates, cyclopentyl-, cyclohexyl- and phenylpropionates of the compounds above.

These new compounds can be compounded with the excipients, auxiliary agents, carriers, etc., which are usually employed to form anabolic preparations for the treatment of mammals. As carrier materials, use can be made of such organic or inorganic substances as are suitable for parenteral, peroral or topical application and which, of course, are inert to the new compounds, as for example water, vegetable oils, polyethylene glycol, gelatin, lactose, starch, magnesium stearate, talc, vaseline, cholesterol, etc. For parenteral application, suitable materials are solutions, preferably oily or aqueous solutions, and also suspensions, emulsions and implantations. For peroral application, tablets or dragees can be used, while for topical application salves or cremes are used which may have been sterilized or mixed with supplementary materials such as preservatives, stabilizers, wetting agents, salts to influence the osmotic pressure, or buffer substances. In general, a unit dosage will comprise about 1–10 mg. of the steroid. The preferred amount of carrier per unit dosage ranges from about 50 to 1000 mg.

The following table illustrates the anabolic activity of a representative steroid of this invention:

TABLE
RATIO OF ANABOLIC/ANDROGENIC ACTIVITY

| Dose per animal (orally) | 1 mg. | 5 mg. | 10 mg. | 25 mg. |
|---|---|---|---|---|
| 3-methylene-17α-methyl-1-androstene-17β-ol | 11.7 | 5.6 | 6.4 | 5.2 |
| 17α methyl-testosterone | 1 | 1 | 1 | 1 |

The anabolic activity was determined by measuring the percent increase in weight of the musculus levator ani in rats. The androgenic activity was determined by measuring the percent increase in weight of the seminal vesicle in rats. The method of determination is that of Hershberger et al., described in Proceedings of the Society for Experimental Biology and Medicine, volume 83, page 175 (1953). The anabolic-androgenic ratios thus obtained are compared to those of the well-known anabolic parent compound methyl-testosterone the ratio of which is assumed to be 1.

It was surprising that 1,2-unsaturated 3-methylene-steroids of the Formula I show such an excellent anabolic activity. The corresponding 3-methylene steroids which are saturated in the 1,2- and 4,5-position or which are saturated in the 1,2-position and unsaturated in the 4,5-position have only a low anabolic efficiency. Similarly, the corresponding 2-dehydro-3-methyl- and 3,5-bis-dehydro-3-methyl steroids are weak anabolics.

The new steroids of this invention, as represented by Formula I, are produced from the corresponding 1-androstene-3-one-17β-ols or their 1- or 17α-alkyl derivatives, from the 17-esters of these compounds or from the corresponding 3-methylene-1-androstene-17-ones.

For example, the following methods can be used in this invention:

(a) A 3-keto-steroid of Formula II

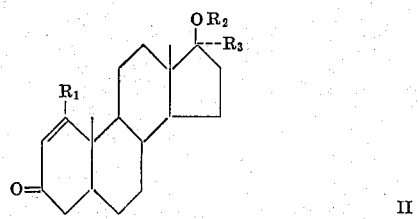

II wherein $R_1$, $R_2$ and $R_3$ have the meanings previously indicated, is reacted with a triaryl-phosphine-methylene of Formula A $$Ar_1Ar_2Ar_3P=CH_2 \qquad A$$

wherein $Ar_1$, $Ar_2$ and $Ar_3$ represent phenyl or identically or differently substituted phenyl groups in the presence of a solvent under the conditions of a Wittig reaction (Wittig and Schöllkopf, Chemische Berichte, volume 87, page 1318 (1954)).

(b) Furthermore, a 17-keto-steroid of Formula III

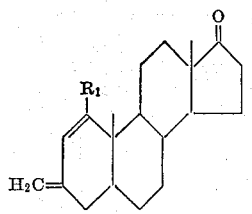

III wherein $R_1$ has the meaning previously indicated, can be reacted with an organo-metallic reagent of Formula B $$R_5Y \qquad B$$

wherein $R_5$ represents methyl or ethyl; Y represents a lithium atom or the group —MgX; X represents chlorine, bromine or iodine.

(c) I is also possible according to the invention, to esterify a steroid of Formula IV

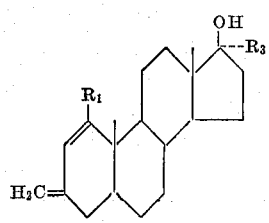

IV wherein $R_1$ and $R_3$ have the meanings previously indicated, with a compound of Formula C.

$$R_4COOH \qquad C$$

wherein $R_4$ has the meaning previously indicated, or with a derivative of such a compound which is suitable for such esterification.

The above methods will now be described more in detail.

(a) For process (a), there may be employed, for example, the following starting materials:

1-androstene-3-one-17β-ol
1-methyl-1-androstene-3-one-17β-ol
17α-methyl-1-androstene-3-one-17β-ol
17α-ethyl-1-androstene-3-one-17β-ol
1,17α-dimethyl-1-androstene-3-one-17β-ol
1-methyl-17α-ethyl-1-androstene-3-one-17β-ol and the corresponding 17-esters of these compounds, particularly their formates, acetates, propionates, butyrates, isobutyrates, valerates, caproates, enanthates, caprylates, hexahydrobenzoates, undecylenates, benzoates, cyclopentyl-, cyclohexyl- and phenyl-acetates, (β-cyclopentyl-), (β-cyclohexyl-) and (β-phenyl-propionates).

The preparation of these starting compounds is described in the literature (f.e., Butenandt and Dannenberg, Berichte der deutschen chemischen Gesellschaft, volume 71, page 1681 (1938); Inhoffen and Zühlsdorff, ibid., volume 76, page 233 (1943); Inhoffen and Huang/Minlon, ibid., volume 73, page 451 (1940); Schering A.G., German Patents 1,023,764 and 1,117,113).

Suitable solvents for the Wittig reaction are preferably ethers such as diethyl ether, tetrahydrofuran or dioxan or mixtures of these; they can also be diluted by another inert solvent. Although the reaction occurs at room temperature, it is, preferably, accelerated by warming the reaction mixture. In presence of low boiling solvents, such as diethyl ether, it is possible to increase the reaction temperature above the boiling point of the solvent by use of pressure vessels. It is also possible to start the reaction in a low boiling solvent which later is replaced by a higher boiling one. The reaction is usually completed after 1 to 48 hours, depending on the reaction temperature and the nature of the solvent. The reaction products can be isolated from the reaction mixture by methods known as such, as for instance by extraction, chromatography or crystallization or by combinations of these methods.

The aryl groups in the triaryl-phosphine-methylene of the Formula A can be unsubstituted or substituted phenyl groups, preferably phenyl, alkylphenyl such as o-, m-, or p-tolyl, xylyl or dialkylaminophenyl such as p-dimethylaminophenyl or p-diethylaminophenyl. The triaryl-phosphine-methylenes are prepared in a manner known as such by reaction of a triarylphosphonium salt, for instance a triaryl phosphonium halide, with an organoalkali compound such as lithium-n-butyl or lithium-phenyl (Wittig and Schöllkopf, l.c.).

(b) For process (b), there may be employed the following starting materials:

3-methylene-1-androstene-17-one
1-methyl-3-methylene-1-androstene-17-one

These starting compounds are obtained, for instance, by oxidation of the corresponding 17β-ols which are prepared from 1-androstene-3-one-17β-ol or its 1-methyl derivative, respectively, as described above. Also, a selective Wittig reaction at the 3-position of 1-androstene-3,17-dione or its 1-methyl derivative, respectively, yields the starting materials for process (b).

Organometallic compounds suitable for process (b) are for instance lithium-methyl, methyl-magnesium chloride, methyl-magnesium bromide, methyl-magnesium iodide, lithium-ethyl, ethyl-magnesium chloride, ethyl-magnesium bromide, ethyl-magnesium iodide.

Process (b) is performed under the usual conditions of a Grignard reaction or of a reaction of a carbonyl compound with an organometallic compound. Preferably, diethyl ether, tetra-hydrofuran or dioxan are used as solvents, but also benzene, toluene or mixtures of solvents can be applied. It is also possible to use a solvent mixture, such as diethyl ether/benzene, from which the low boiling component is removed by distillation during the reaction. The reaction is preferably conducted at room temperature, sometimes with cooling, until the reaction has started; then the reaction is completed by warming or refluxing. It is useful to work in an atmosphere of an inert gas, for example under nitrogen, particularly when organo-lithium compounds are applied.

The reaction mixture is worked up in the usual way by decomposition with acids, as hydrochloric acid, salt solutions, as ammonium chloride solution, or water. The products can be isolated by extraction, chromatography and/or crystallization. A prolonged treatment with strong acids should be avoided, since the tertiary hydroxyl group in the 17β-position can thus be eliminated.

(c) 17β-hydroxysteroids of the Formula IV above which can be obtained by processes (a) or (b) can be esterified with an acid of the Formula C or with a derivative of such an acid which is suitable for esterification. Suitable derivatives as for instance the acid chlorides, acid bromides, anhydrides or—for transesterification methods—the lower alkyl esters of the following acids as well as these acids themselves can thus be used: formic, acetic, propionic, butyric, isobutyric, valeric, isovaleric, trimethyl-acetic, caproic, isocaproic, tert.-butyl-acetic, enanthic, caprylic, caprinic, hexahydrobenzoic, undecylenic, benzoic, cyclopentyl-, cyclohexyl- and phenylacetic, β-cyclopentyl-, β-cyclohexyl- and β-phenylpropionic acids. For acetylations, ketene can also be applied.

Without further elaboration, it is believed that the preceding description will enable one skilled in the art to practice this invention to its fullest extent. It is to be understood, therefore, that the following preferred embodiments of this invention are merely exemplary in nature, and are not to be construed as limitative of the remainder of the specification or appended claims in any way whatsoever.

Example 1

232 cc. of a 1.055 N solution of n-butyllithium in ether are added to a suspension of 97 g. methyl-triphenyl-phosphonium bromide in 1.35 liters of absolute ether while nitrogen is bubbled into the mixture which is cooled with ice. After 2 hours stirring at room temperature, a solution of 15.9 grams of 1-androstene-3-one-17β-ol in 1.4 liters of tetrahydrofuran ether is added within 15 minutes. The mixture is stirred for 4 hours at room temperature and left overnight. The ether is replaced by tetrahydrofuran, and the mixture is refluxed for six hours. After being allowed to cool, the mixture is poured into 7.5 liters of water and extracted 3 times with 3 liters of ether each. The combined extracts are washed 3 times with 1.5 liters of water each, dried with sodium sulfate, and the ether is removed by distillation. The crude product is chromatographed in petroleum ether/ether 1:1 over 450 grams of basic, air-free alumina. 14.4 grams of 3-methylene-1-androstene-17β-ol are thus eluted; M.P. 100–102° C. (from petroleum ether); $(\alpha)_D^{24}+31°$ (in chloroform); $\lambda_{max}$ 234.5 mμ, $E_{1\,cm.}^{1\%}$ 728, shoulders at 228 and 243 mμ (in ethanol).

Example 2

(a) Under nitrogen, 34.9 grams of chromium trioxide are added to 356 cc. of absolute pyridine at a temperature of 10° C. A solution of 15.8 grams of 3-methylene-1-androstene-17β-ol in 85 cc. of absolute pyridine is then added dropwise at 8° C. The mixture is stirred for 3 hours with cooling, allowed to stand at room temperature overnight and worked up in the usual way with petroleum ether and water. The 3-methylene-1-androstene-17-one thus obtained shows M.P. 97–99° (from methanol); $(\alpha)_D+126°$ (in chloroform); $\lambda_{max}$ 234.5 mμ.

$E_{1\,cm.}^{1\%}$ 794, shoulders at 228 and 244 mμ (in ethanol).

(b) 6.3 grams of 3-methylene-1-androstene-17-one are dissolved in 380 cc. of absolute ether. Under a nitrogen atmosphere, a solution of 2.44 grams of methyllithium in 270 cc. of absolute ether is added within 20 minutes while cooling with ice. The mixture is stirred for 4 hours at room temperature, poured into 1 liter of ice water and extracted 3 times with 500 cc. of ether each. The combined extracts are washed 3 times with 300 cc. of water each, dried with sodium sulfate and evaporated to dryness. The residue is dissolved in petroleum ether/ether (4:3) and chromatographed over 180 grams of basic alumina saturated with nitrogen. First, 1.53 grams of starting material is eluted. With petroleum ether/ether (1:1), 4.18 grams of 3-methylene-17α-methyl-1-androstene- 17α-ol are obtained then; M.P. 108–110° C. (from acetone); $(\alpha)_D^{23}+10°$ (in chloroform); $\lambda_{max}$ 235 mμ, $E_{1\,cm.}^{1\%}$ 723, shoulders at 228 and 245 mμ (in ethanol).

Example 3

(a) Analogously to Example 2a), 1-methyl-3-methylene-1-androstene-17-one is prepared from 1-methyl-3-methylene-1-androstene-17β-ol. According to the method of Example 2b), the 1-methyl-3-methylene-1-androstene-17-one is transformed into 1,17α-dimethyl-3-methylene-1-androstene-17β-ol.

(b) A solution of 7.53 grams of methyl iodide in 36 cc. of absolute ether is added within 15 minutes to a suspension of 1.51 grams of magnesium turnings in 40 cc. of absolute ether with stirring. The mixture is refluxed for 1 hour. A solution of 4.2 grams of 1-methyl-3-methylene-1-androstene-17-one in 100 cc. of absolute tetrahydrofuran is added dropwise and the refluxing is continued for 2 more hours. The mixture is allowed to cool, poured into 500 cc. of a 2 percent aqueous ammonium chloride solution and worked up in the usual way with ether and water. The thus obtained 1,17α-dimethyl-3-methylene-1-androstene-17β-ol is purified chromatographically over basic air-free alumina.

The same result is obtained when methyl bromide or methyl chloride is used instead of methyl iodide.

Example 4

1.2 grams of 3-methylene-1-androstene-17β-ol are dissolved in a mixture of 3.5 cc. of pyridine and 5 cc. of benzene. A solution of 1.2 grams of β-cyclohexylpropionyl chloride in 8 cc. of benzene is added. The mixture is allowed to stand overnight at room temperature and worked up in the usual way with petroleum ether and water. The crude product is purified by chromatography over 50 grams of neutral alumina. The desired 3-methylene - 1-androstene-17β-ol-17-(β-cyclohexylpropionate) is eluted with a 2:1 mixture of petroleum ether and ether. $\lambda_{max}$ 235 mμ, $E_{1\,cm.}^{1\%}$ 695 shoulders at 228 and 244 mμ (in ethanol).

Example 5

Under a nitrogen atmosphere, 92 cc. of a 0.99 N solution of n-butyllithium in ether is added to a suspension of 35.8 grams of methyl-triphenyl-phosphonium bromide in 510 cc. of absolute ether with ice-cooling. The mixture is stirred for 2 hours at room temperature. 420 cc. of the solution of triphenyl-phosphine-methylene thus obtained is pressed through a glass tube within one hour into a solution of 10 grams of 1-androstene-3-one-17β-ol-17-acetate in 750 cc. of absolute tetrahydrofuran. The procedure of Example 1 is then followed. The crude product is chromatographed over 300 grams of neutral alumina with a 1:1 mixture of petroleum ether and ether. First, 3 - methylene - 1 - androstene-17β-ol-17-acetate is eluted; M.P. 84–86° C. (from petroleum ether); $(\alpha)_D^{24} +35°$ (in chloroform); $\lambda_{max}$ 235 mμ.

$$E_{1\,cm.}^{1\%}\ 703$$

shoulders at 228 and 234 mμ (in ethanol). This is followed by 3-methylene-1-androstene-17β-ol, M.P. 100° C.

In an analogous manner, 1-methyl-1-androstene-3-one-17β-ol-17-acetate is transformed into a mixture of 1-methyl-3-methylene-1-androstene-17β-ol and its 17 - acetate which are separated chromatographically as described above.

Instead of methyl - triphenyl - phosphonium bromide, methyl-tri-(p-tolyl)-phosphonium bromide or methyl-tri-(p-dimethylaminophenyl)-phosphonium bromide may be used. In the latter case, the ethereal extract is washed first with dilute hydrochloric acid, then with water during the work-up.

Example 6

With the method described in Example 1, 17α-methyl-1-androstene-3-one-17β-ol is transformed into 3-methylene-17α-methyl-1-androstene-17β-ol; M.P. 108–109° C. (from acetone); $(\alpha)_D^{23} +10°$ (in chloroform); $\lambda_{max}$ 234.5 mμ, $$E_{1\,cm.}^{1\%}\ 723$$

shoulders at 228 and 244 mμ (in ethanol).

Example 7

1 gram of 3-methylene-1-androstene-17β-ol is allowed to stand overnight with 10 cc. of absolute pyridine and 10 cc. of acetic anhydride in a stoppered flask. The mixture is worked up with benzene and water in the usual manner. The 3 - methylene-1-androstene-17β-ol-17-acetate thus obtained is recrystallized from petroleum ether; M.P. 84–85° C.; $(\alpha)_D^{24} +34°$ (in chloroform); $\lambda_{max}$ 234.5 mμ, $$E_{1\,cm.}^{1\%}\ 715$$

shoulders at 228 and 244 mμ (in ethanol).

In an analogous manner, the 17-propionate, the 17-enanthate, the 17-(β-cyclopentyl-propionate), the 17-benzoate, the 17-(β-phenyl-propionate) and the 17-undecylenate are obtained.

Example 8

1.9 grams of 3-methylene-1-androstene-17-one are dissolved in a mixture of 40 cc. of absoulte tetrahydrofuran and 80 cc. of absolute ether. Within 15 minutes, a solution of 1.27 grams of lithium-ethyl in 85 cc. of ether is added at room temperature. The mixture is stirred for 3.5 hours and worked up in the usual way with ether and water. The crude product is chromatographed over 70 grams of neutral alumina. Some starting material is recovered by elution with a 2:1 mixture of petroleum ether and ether, followed by the desired 3-methylene-17α-ethyl-1-androstene-17β-ol; $\lambda_{max}$ 235 mμ, $$E_{1\,cm.}^{1\%}\ 718$$

shoulders at 228 and 243 mμ (in ethanol).

In an analogous manner, 1-methyl-3-methylene-17α-ethyl-1-androstene-17β-ol is obtained from 1-methyl-3-methylene-1-androstene-17-one.

Example 9

1 gram of 1-methyl-3-methylene-1-androstene-17β-ol is allowed to stand overnight together with 10 cc. of absolute pyridine and 10 cc. of acetic anhydride in a stoppered flask. The mixture is worked up in the usual way with benzene and water. The thus obtained 1-methyl-3-methylene-1-androstene-17β-ol-17-acetate is recrystallized from petroleum ether.

In an analogous manner, the 17-propionate, the 17-enanthate, the 17-(β-cyclopentylpropionate), the 17-benzoate, the 17-(β-phenylpropionate) and the 17-undecylenate are obtained.

The following compositions are preferred embodiments of pharmaceutical preparations embodying the novel steroids of this invention:

Example 10
Tablets

| Each tablet contains: | Milligrams |
|---|---|
| 3-methylene-1-androstene-17β-ol | 5 |
| lactose | 120 |
| starch | 15 |
| talc | 10 |

Example 11
Tablets

| Each tablet contains: | Milligrams |
|---|---|
| 3-methylene-17α-methyl-1-androstene-17β-ol | 5 |
| lactose | 120 |
| starch | 15 |
| magnesium stearate | 2 |
| talc | 8 |

Example 12
Aqueous suspension

| Each ampoule contains: | |
|---|---|
| 3 - methylene - 17α-methyl-1-androstene-17β-ol, mg. | 10 |
| sodium chloride, mg. | 7 |
| carboxymethyl cellulose, mg. | 2 |
| methyl p-hydroxybenzoate, mg. | 1 |
| water, add, ml. | 1 |

Example 13
Tablets

| Each tablet contains: | Milligrams |
|---|---|
| 1-methyl-3-methylene-1-androstene-17β-ol | 3 |
| lactose | 90 |
| starch | 15 |
| magnesium stearate | 2 |
| talc | 10 |

Example 14
Tablets

| Each tablet contains: | Milligrams |
|---|---|
| 1,17α - dimethyl - 3 - methylene - 1 - androstene 17β-ol | 5 |
| lactose | 90 |
| starch | 15 |
| magnesium stearate | 2 |
| talc | 10 |

Example 15
Tablets

| Each tablet contains: | Milligrams |
|---|---|
| 3 - methylene - 17α - ethyl - 1 androstene - 17β-ol | 5 |
| lactose | 90 |
| starch | 15 |
| magnesium stearate | 2 |
| talc | 10 |

Example 16
Tablets

| Each tablet contains: | Milligrams |
|---|---|
| 1 - methyl - 3 - methylene - 17α - ethyl - 1 - androstene-17β-ol | 5 |
| lactose | 90 |
| starch | 15 |
| magnesium stearate | 2 |
| talc | 10 |

Example 17

Aqueous suspension

Each ampoule contains:

| | |
|---|---|
| 3 - methylene - 1 - androstene - 17β - ol - 17-(β-cyclohexylpropionate), mg. | 10 |
| sodium chloride, mg. | 7 |
| carboxymethyl cellulose, mg. | 2 |
| methyl p-hydroxybenzoate, mg. | 0.5 |
| propyl p-hydroxybenzoate, mg. | 0.3 |
| phenol, mg. | 3 |
| water, add, ml. | 1 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A compound of the formula

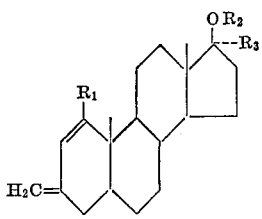

wherein $R_1$ is selected from the group consisting of hydrogen and methyl; $R_2$ is selected from the group consisting of hydrogen and the group $R_4CO$—; $R_3$ is selected from the group consisting of hydrogen, methyl and ethyl; and $R_4$ is selected from the group consisting of an aliphatic, a cycloaliphatic, an olefinic, an aromatic and an araliphatic hydrocarbon radical of up to 12 carbon atoms.

2. A compound of the formula

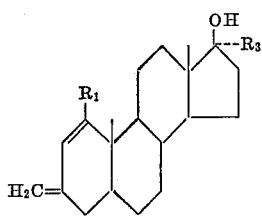

wherein $R_1$ is selected from the group consisting of hydrogen and methyl; and $R_3$ is selected from the group consisting of hydrogen, methyl and ethyl.

3. A compound of the formula

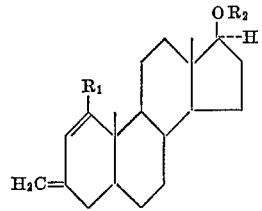

wherein $R_1$ is selected from the group consisting of hydrogen and methyl; $R_2$ is selected from the group consisting of hydrogen and $R_4CO$—; and $R_4$ is selected from the group consisting of an aliphatic, a cycloaliphatic, an olefinic, an aromatic and an araliphatic hydrocarbon radical of up to 12 carbon atoms.

4. A compound of the formula

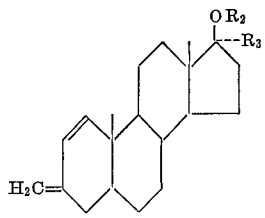

wherein $R_2$ is selected from the group consisting of hydrogen and $R_4CO$—; $R_3$ is selected from the group consisting of hydrogen, methyl and ethyl; and $R_4$ is selected from the group consisting of an aliphatic, a cycloaliphatic, an olefinic, an aromatic and an araliphatic hydrocarbon radical of up to 12 carbon atoms.

5. A comopund of the formula

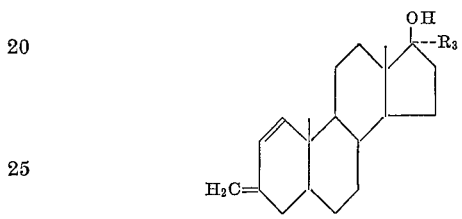

wherein $R_3$ is selected from the group consisting of hydrogen, methyl and ethyl.

6. 3-methylene-1-androstene-17β-ol.
7. 1-methyl-3-methylene-1-androstene-17β-ol.
8. 3-methylene-17α-methyl-1-androstene-17β-ol.
9. 3-methylene-17α-ethyl-1-androstene-17β-ol.
10. 1,17α-dimethyl-3-methylene-1-androstene-17β-ol.
11. 1 - methyl-3-methylene-17α-ethyl-1-androstene-17β-ol.
12. 3-methylene-1-androstene-17β-ol-17-acetate.
13. 1 - methyl - 3 - methylene - 1-androstene-17β-ol-17-acetate.
14. 3 - methylene - 1 - androstene - 17β-ol-17-(β-cyclohexyl-propionate).
15. A pharmaceutical composition in unit dosage form comprising a compound as claimed in claim 1 together with a pharmaceutically acceptable carrier.
16. A pharmaceutical composition in unit dosage form comprising 1 to 10 mg. of a compound as claimed in claim 1 together with a pharmaceutically acceptable carrier.
17. A pharmaceutical composition in unit dosage form comprising a comopund as claimed in claim 8 together with a pharmaceutically acceptable carrier.
18. A pharmaceutical composition in unit dosage form comprising 1 to 10 mg. of a compound as claimed in claim 8 together with a pharmaceutically acceptable carrier.
19. A method of effecting anabolic activity in mammals which method comprises administering to said mammals a compound as claimed in claim 1.
20. A method of effective anabolic activity in mammals which method comprises administering to said mammals a compound as claimed in claim 8.

References Cited by the Examiner

Chinn, L. J.: J. Org. Chem., 27, p. 2703 (1962).
Evans et al.: J. Chem. Soc., pp. 3578–3582 (1963).

LEWIS GOTTS, *Primary Examiner.*

T. MESHBESHER, *Assistant Examiner.*